United States Patent [19]
Tokumaru et al.

[11] Patent Number: 5,471,456
[45] Date of Patent: Nov. 28, 1995

[54] OPTICAL MEDIUM RECORDING APPARATUS WITH A ROTATABLE OPTICAL BEAM DEFLECTOR

[75] Inventors: Haruki Tokumaru; Koichi Maruyama; Syunitirou Wakamiya, all of Tokyo, Japan

[73] Assignees: Asahi Kogaku Kogyo Kabushiki Kaisha; Nippon Hoso Kyokai, both of Tokyo, Japan

[21] Appl. No.: 184,447

[22] Filed: Jan. 21, 1994

[30] Foreign Application Priority Data

Jan. 21, 1993 [JP] Japan .................................. 5-008017
Jan. 21, 1993 [JP] Japan .................................. 5-008018

[51] Int. Cl.⁶ .................................................... G11B 7/09
[52] U.S. Cl. .......................... 369/112; 369/44.17; 369/97; 369/116; 369/119
[58] Field of Search ................................. 369/112, 44.18, 369/97, 119, 44.17, 107, 113, 180, 119

[56] References Cited

U.S. PATENT DOCUMENTS

| | | | |
|---|---|---|---|
| 4,998,790 | 3/1991 | Iizuka et al. .......................... | 359/207 |
| 5,151,890 | 9/1992 | Yonekubo .............................. | 369/112 |
| 5,194,981 | 3/1993 | Morimoto .............................. | 359/217 |
| 5,272,689 | 12/1993 | Tsujioka et al. ........................ | 369/97 |
| 5,287,341 | 2/1994 | Ozue et al. ............................. | 369/97 |
| 5,369,631 | 11/1994 | Hwang .................................. | 369/113 |

*Primary Examiner*—Georgia Y. Epps
*Assistant Examiner*—Kim-Kwok Chu
*Attorney, Agent, or Firm*—Sandler, Greenblum, & Bernstein

[57] ABSTRACT

An optical recording and reproducing apparatus is provided with a light source that emits a beam of light, a rotatable head including a deflector that deflects the beam in a predetermined direction and an objective lens group which forms an image of the beam on an optical recording medium. The rotatable head rotates about an optical axis of the beam which is incident upon the rotatable head. A movable lens group, provided in an optical path of the beam between the light source and the rotatable head, is movable in at least an optical axis direction.

30 Claims, 12 Drawing Sheets

_OPTICAL MEDIUM RECORDING APPARATUS WITH A ROTATABLE OPTICAL BEAM DEFLECTOR_

BACKGROUND OF THE INVENTION

1. Field of the Invention

The present invention relates to an optical recording and reproducing apparatus for recording optical data onto a recording medium and reproducing the recorded optical data from the recording medium. More precisely, the present invention relates to an optical recording and reproducing apparatus in which a optical tape (recording tape) is used as a recording medium.

2. Description of Related Art

There are known optical recording/reproducing apparatuses which record and reproduce optical data onto and from a recording medium, such as a compact disk, video disk, or magneto-optical disk, etc.

In such known optical recording/reproducing apparatuses, the diameter of the beam incident on the recording medium is limited to a minimum value corresponding to a diffractive limit. Accordingly, the packing density, determined by the diffractive limit, is limited. Consequently, to increase the amount of data that can be recorded on the recording medium, it is necessary to increase the recording area of the recording medium. However, in practice, there is a limit to the diameter of a disk-shaped recording medium.

The use of optical tape as the recording media, which can provide a larger recording area than the disk-shaped recording media, has been proposed.

Upon recording data on and reproducing data from an optical tape, it is advisable to rotate a recording and reproducing head across the tape in order to increase the recording and reproducing speed, as is well known in conventional magnetic VTR's.

Unlike a magnetic recording and reproducing apparatus, it is necessary to move a beam on the recording medium at high speed to scan the recording medium in an optical recording and reproducing system. Also, in an optical recording and reproducing system, it is necessary to additionally provide a focusing mechanism for converging a beam onto the recording medium and a tracking mechanism for converging a beam onto a predetermined recording track of the recording medium.

In a conventional optical disk apparatus in which the optical disk rotates, it is not necessary to move an objective lens in order for the beam to be moved relative to the recording medium to perform the recording and reproducing operations. Accordingly, the objective lens can be easily moved to perform the focusing and tracking operations.

However, if a optical tape is used as the recording medium, it is necessary not only to move the optical tape, but also to move the beam across the optical tape. To move the beam, it is necessary to move the objective lens at high speed. However, since the objective lens is subject to a centrifugal force during the movement thereof at high speed, it is difficult to execute precise focusing and tracking operations by moving the objective lens, as in conventional optical disk apparatuses.

In a known multi-beam system in which a plurality of beams are formed on a recording medium to simultaneously record data on or reproduce data from a plurality of recording tracks of the recording medium, if a collimating lens is driven to carry out the focusing operation, the magnification changes, resulting in the variation of the distance between the incident beams.

SUMMARY OF THE INVENTION

The primary object of the present invention is to provide an optical recording and reproducing apparatus which optically records data on and/or reproduces data from a optical tape. In particular, the present invention aims at the realization of an appropriate focusing and tracking system in an optical recording and reproducing apparatus in which an objective lens is incorporated in a rotatable optical head.

Another object of the present invention is to provide a multi-beam system of an optical recording and reproducing apparatus, in which the focusing operation is performed by a lens other than the objective lens to prevent or restrict a change in the distance between the beams incident on the recording medium.

According to the present invention, an optical recording and reproducing apparatus is provided which includes a light source that emits a beam of light, a rotatable head including a deflector which deflects the beam in a predetermined direction and an objective lens group which forms an image of the beam on an optical recording medium. The rotatable head rotates about an optical axis of the beam which is incident upon the rotatable head, and a movable lens group is provided between the light source and the rotatable head. The movable lens group is movable in at least an optical axis direction.

Preferably, the movable lens is also movable within a plane perpendicular to the optical axis.

In a preferred embodiment, a relay lens group is provided between the movable lens group and the objective lens group, wherein an exit pupil of the movable lens is made substantially conjugate with an entrance pupil of the objective lens group by the relay lens.

According to another aspect of the present invention, an optical recording and reproducing apparatus is provided which includes a light source that emits a beam of light, a rotatable head including a deflector which deflects the beam in a predetermined direction and an objective lens group which forms an image of the beam on an optical recording medium. The rotatable head rotates about an optical axis of the beam which is incident upon the rotatable head, and a movable lens group is provided between the light source and the rotatable head. The movable lens group is movable in at least a plane perpendicular to the optical axis.

Preferably, the movable lens is also movable in the optical axis direction.

According to still another aspect of the present invention, an optical recording and reproducing apparatus is provided which includes a light source that emits a plurality of beams, an objective lens group which forms a plurality of images of the beams on an optical recording medium and a focusing lens group is provided in an optical path of the beams between the light source and the objective lens group. The focusing lens is movable in the optical axis direction, and a relay lens group is provided between the focusing lens group and the objective lens group. A point that is located at a predetermined distance from a rear principal point of the focusing lens is maintained substantially conjugate with a front focal point of the objective lens group by the relay lens group. Further, the predetermined distance is equivalent to a distance between the light source and a front principal point of the focusing lens. The rear principal point is defined as the principal point of the focusing lens on an objective lens side of the optical path, and the front principal point is defined as the principal point of the focusing lens on a light source side of the optical path. The front focal point is defined as the focal point of the objective lens on the light source side of the optical path.

Preferably, the predetermined distance is identical to a focal length of the focusing lens. It is also preferable that the beams emitted from the relay lens group are collimated.

In a preferred embodiment, the relay lens unit has no power and an angular magnification of −1.

The inventors of the present invention have found that when the collimating lens, which collimates the beam emitted from a light source is used as a tracking and focusing lens in an optical system having no relay lens, the following problems exist. For instance, when the collimating lens is moved in the optical axis direction to perform the focusing operation, the movement of the collimating lens towards the objective lens i.e., in the optical axis direction causes the beam which is made incident on the objective lens to converge. Consequently, the numerical aperture (N.A.) of the objective lens is substantially reduced. Accordingly, the size of the beam diameter incident upon the recording medium is increased, which results in increased crosstalk and a lower packing density. Conversely, movement of the collimating lens towards the light source causes the beam to diverge, which limits the amount of light that can be utilized due to the occurrence of vignetting.

When the collimating lens is moved within a plane perpendicular to the optical axis to perform the tracking operation, the movement of the collimating lens causes the beam emitted from the light source to be inclined, so that the amount of light that is not received by the objective lens is increased. Thus, the utilization efficiency of light is varied by the tracking operation. The change in utilization efficiency can be eliminated by increasing the diameter of the beam incident upon the objective lens. However, this lowers the utilization efficiency of light emitted from the light source.

Consequently, in the case that there is a large distance between the collimating lens and the objective lens, the tracking and focusing can only be performed in a narrow range.

According to the present invention, a relay lens system is provided between the movable tracking and focusing lens and the objective lens. Since the relay lens system forms an image of a laser source and the objective lens further reforms the image of the laser source, an optical recording and reproducing apparatus having an increased freedom of design and an enhanced utilization efficiency of light can be easily obtained.

The present disclosure relates to subject matter contained in Japanese patent application Nos. 5-8017 and 5-8018 (both filed on Jan. 21, 1993) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
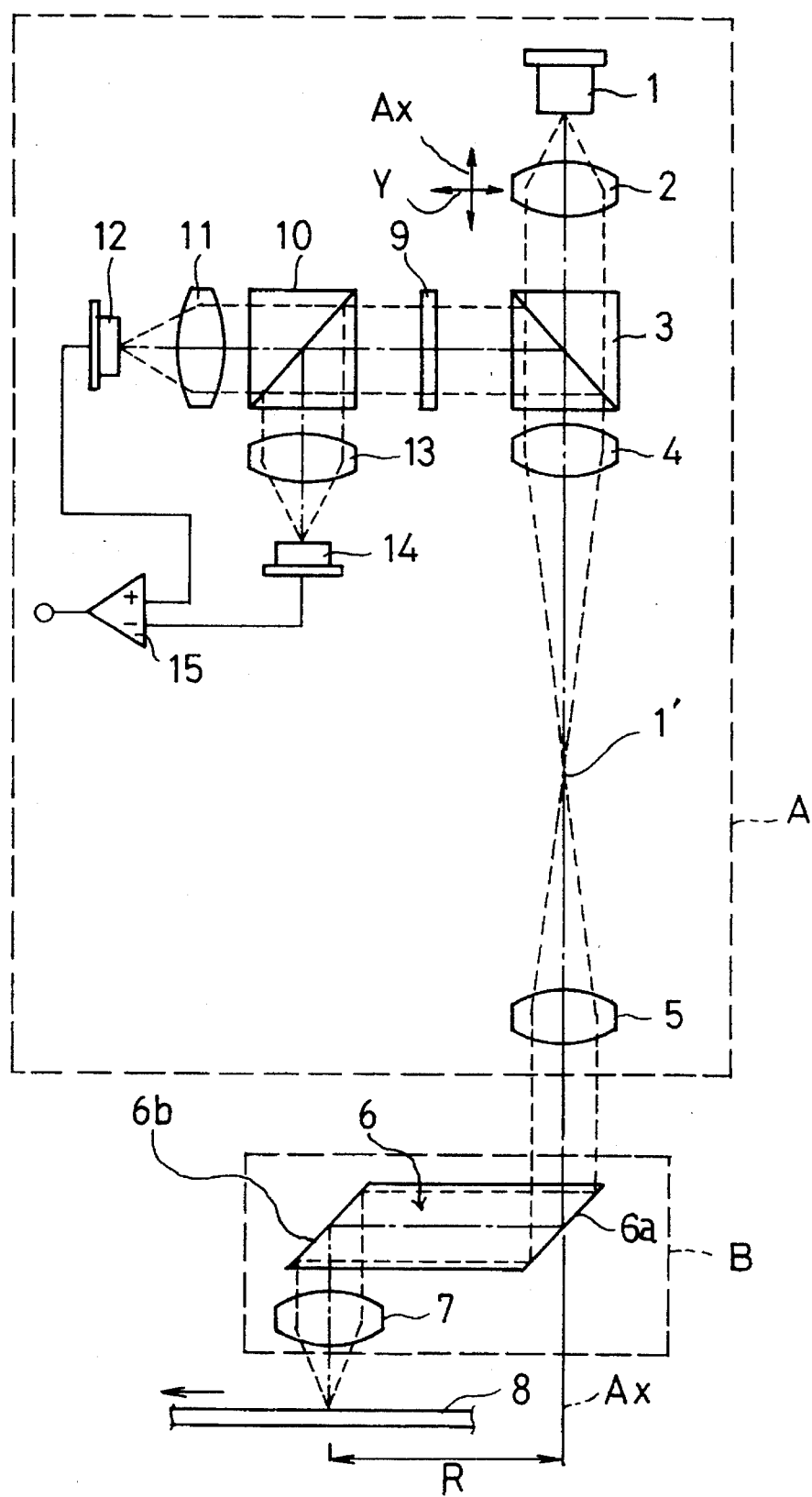
FIG. 1 is a conceptual view of an optical recording and reproducing apparatus according to the present invention.

In FIG. 1 which shows a magneto-optical tape recording system according to the present invention, a surface of an optical tape 8 is coated with a magnetic film, by a process which is well known. The optical recording and reproducing apparatus records data on the magnetic optical tape with the help of a magnetic field and heat produced by the recording laser beam, and reproduces the recorded data from the optical tape 8 by the magneto optic Kerr effect produced when the reading laser beam is reflected by the optical tape, similar to a conventional magneto-optical disk apparatus.

The beams emitted from a semiconductor laser source 1 are collimated by a collimating lens 2 and are transmitted through a first beam splitter 3. In the illustrated embodiment, the collimating lens 2 is a movable lens which is moved in a direction of the optical axis Ax and within a plane Y perpendicular to the optical axis Ax to perform the focusing and tracking operations, respectively.

The beam transmitted through the first beam splitter 3 is relayed by a relay lens group comprised of lenses 4 and 5. The optical elements including the semiconductor laser 1, the collimating lens 2, the first beam splitter 3, and the relay lenses 4 and 5 are provided within a stationary portion "A".

The beam transmitted through the relay lens 5 is reflected by a first reflecting surface 6a of a prism 6 in a direction normal to the optical axis Ax. The prism 6 which constitutes a deflector is provided in a rotatable head "B" which rotates about the optical axis Ax with respect to the stationary portion "A". The beams reflected by the first reflecting surface 6a are reflected again by a second reflecting surface 6b of the prism 6 to be parallel with the optical axis Ax.

The beam reflected by the second reflecting surface 6b is then made incident upon an objective lens 7 provided within the rotatable head "B" to be converged onto the optical tape 8 to thereby form a beam spot. The beam spot is moved along a circular locus within a plane perpendicular to the rotation axis (i.e., optical axis Ax) of the rotatable head "B" when the latter rotates. Note that "R" designates the radius of a circle along which the rotational movement of the objective lens 7 takes place.

The relay lens 4 condenses the beams emitted from the collimating lens 2 to form an image 1' of the semiconductor laser 1, and the relay lens 5 converts the image 1' again to a parallel beam to be made incident upon the prism 6 (objective lens 7). The provision of the relay lenses 4 and 5 between the collimating lens 2 and the objective lens 7 contributes to an increase in the freedom of design of the optical system thereby improving the utilization efficiency of light which would be otherwise lowered when the collimating lens 2 is moved.

In the illustrated embodiment, the relay lenses 4 and 5 are provided to make an exit pupil of the collimating lens 2 substantially conjugate with an entrance pupil of the objective lens 7. Due to the relay lenses 4 and 5 which are disposed between the collimating lens 2 and the objective lens 7, an image of the exit pupil of the collimating lens 2 is formed (i.e., projected) onto the entrance pupil of the objective lens 7, so that light can be effectively transmitted, regardless of the movement of the collimating lens 2 in the optical axis direction Ax to carry out the focusing operation or within the plane Y perpendicular to the optical axis Ax to carry out the tracking operation. Any movement of the exit pupil of the collimating lens with respect to the exit pupil of the objective lens when the collimating lens is moved is negligible.

The beam reflected from the optical tape 8 is collimated by the objective lens 7, and is made incident upon the first beam splitter 3 through the relay lenses 4 and 5. The light reflected by the first beam splitter 3 is transmitted through an ½ wave plate 9 where the direction of polarization of the light is turned by 45° and is then split into P-polarized light component and S-polarized light component by a polarization beam splitter 10.

The P-polarized light component transmitted through the polarization beam splitter 10 is converged onto a first light receiving element 12 by a condenser lens 11. The S-polarized light component reflected by the polarization beam splitter 10 is converged onto a second light receiving element 14 by a condenser lens 13.

Since the intensity of the polarized light component varies depending on the direction of the magnetic field in the area of the optical tape on which the beam spot is converged, reproduction signals from the optical tape 8 can be obtained in accordance with a difference between the output values of the light receiving elements 12 and 14 which is obtained by a subtracter 15. Track error signal and focus error signal can be obtained by detecting at least one of the output values of the light receiving elements. The collimating lens 2 is moved by an actuator (not shown) in accordance with the track error signal or the focus error signal to correct the track error or the focus error. Each of the light receiving elements 12 and 14 has divided light receiving areas to detect the track error or focus error, as is well known. The detection of the track error and the focus error is per se known. Accordingly, no detailed explanation therefore will be given herein.

In the illustrated embodiment, the focusing and tracking operations are effected by the collimating lens 2. The relay lenses 4 and 5 are comprised of identical positive lens which are symmetrically arranged so that the focal points thereof are located on the same point. Consequently, the relay lenses 4 and 5, as a whole, have no power and have an angular magnification of −1. The conjugate distance "d" of the relay lenses 4 and 5, which is constant since the angular magnification is −1 in this embodiment, is given by the following equation;

$$d=4f+2HH$$

wherein "f" designates the focal length of the positive lens (i.e., the relay lenses 4 and 5 ), and "HH" the distance between the principal points of the positive lenses, respectively.

In the illustrated embodiment, the conjugate distance is constant regardless of the distance between the collimating lens 2 and the relay lens 4, as mentioned above. Consequently, the relay lenses 4 and 5 can be located at any positions between the collimating lens 2 and the objective lens 7, provided that the distance between the emission surface of the collimating lens 2 and the incident surface of the objective lens 7 is substantially identical to the conjugate distance "d" of the relay lenses 4 and 5.

Figure 2:
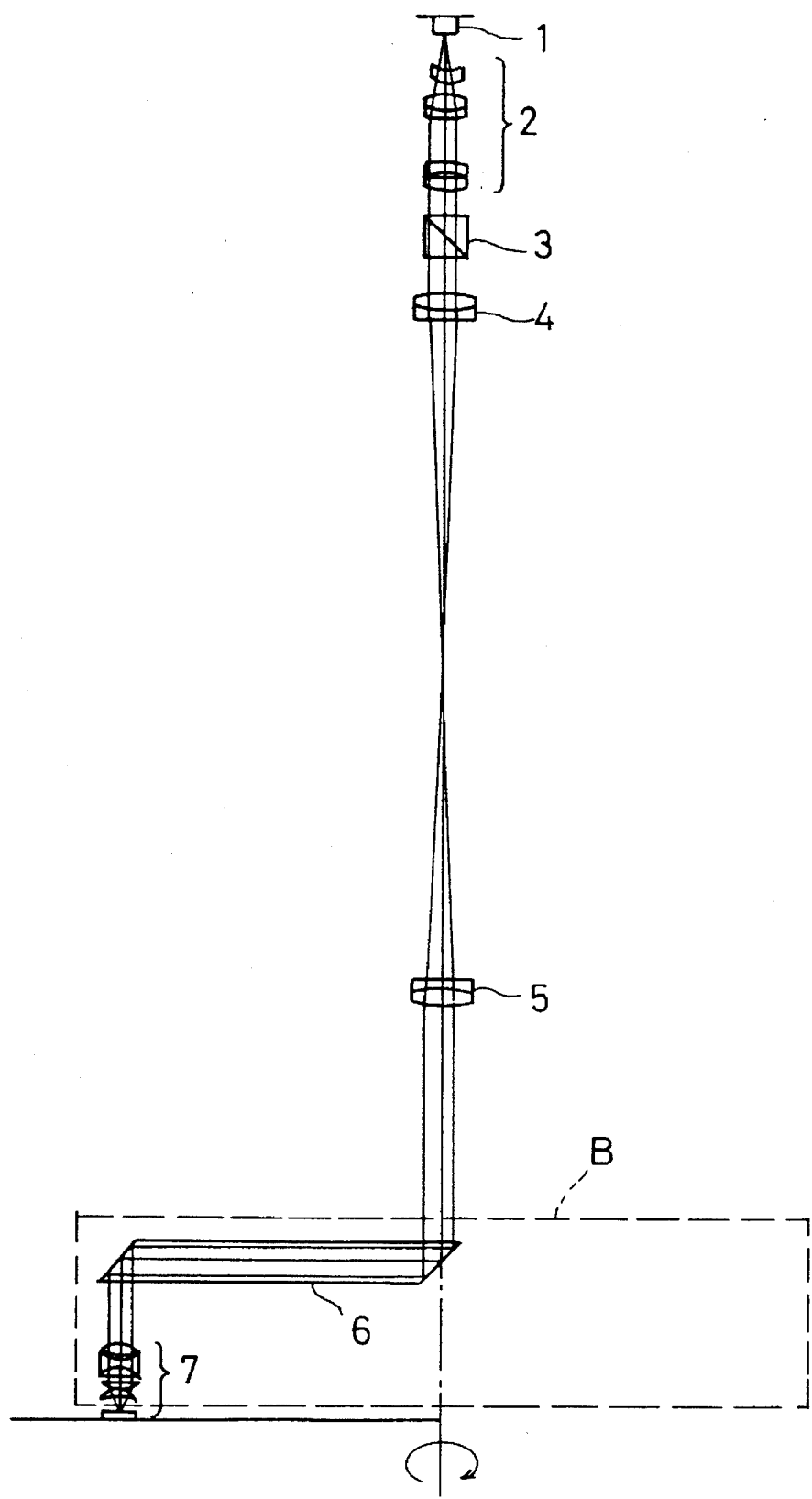
FIG. 2 is an explanatory view of an optical system of an optical recording and reproducing apparatus according to a first embodiment of the present invention.

FIG. 2 shows a more concrete structure of an optical system shown in FIG. 1. Numerical data of the optical elements are shown in Tables below. In Tables below, the surface number is reckoned from the side of the semiconductor laser 1. "r" designates the radius of curvature, "d" the thickness of the lens or spatial distance thereof, "nd" the refractive index at the d-line (588 nm), "v" the Abbe's number, and "n780" the refractive index at the Wavelength of 780 nm, respectively.

Since the deflector is constituted by the prism 6 in the illustrated embodiment, the thickness of the prism 6 is substituted by a reduced thickness to calculate the conjugate distance. "Reduced thickness" represents the thickness of an element divided by the index of refraction of the element.

Table 1 below shows a structure of the collimating lens 2. The collimating lens 2 is comprised of five lenses, of which the second and third lenses are adhered to each other. In Table 1, "$d_0$" designates the distance between the semiconductor laser 1 and the first lens surface of the collimating lens 2.

TABLE 1

| | ($d_0$ = 4.861) | | | | |
|---|---|---|---|---|---|
| surface number | r | d | nd | v | n780 |
|---|---|---|---|---|---|
| 1 | −7.871 | 1.900 | 1.88300 | 40.8 | 1.86888 |
| 2 | −6.230 | 1.970 | | | |
| 3 | 16.830 | 1.900 | 1.61800 | 63.4 | 1.61139 |
| 4 | −7.241 | 1.200 | 1.84666 | 23.8 | 1.82484 |
| 5 | −15.563 | 6.280 | | | |
| 6 | 36.250 | 1.300 | 1.84666 | 23.8 | 1.82484 |
| 7 | 14.372 | 0.450 | | | |
| 8 | 116.842 | 1.600 | 1.72916 | 54.7 | 1.72007 |

TABLE 1-continued ($d_0 = 4.861$)

| surface number | r | d | nd | v | n780 |
|---|---|---|---|---|---|
| 9 | −17.350 | | | | |

Table 2 below shows a structure of the beam splitter 3. In Table 2, "$d_1$" designates the distance between the terminal lens surface of the collimating lens 2 and the first surface of the beam splitter 3. The reduced thickness of the beam splitter 3 is 3.972 mm.

TABLE 2

($d_1 = 4.000$)

| surface number | r | d | nd | v | n780 |
|---|---|---|---|---|---|
| 1 | ∞ | 6.000 | 1.51633 | 64.1 | 1.51072 |
| 2 | ∞ | | | | |

Table 3 below shows a structure of the relay lenses 4 and 5. The relay lenses 4 and 5 are each comprised of positive and negative lens elements which are adhered to each other to have a same positive power as a whole, and are arranged in a symmetrical manner. The relay lenses 4 and 5 have an identical focal length. The conjugate distance of the relay lenses 4 and 5, which is constant in this embodiment, is 199.984 mm. "$d_2$" designates the distance between the terminal surface of the beam splitter 3 and the first surface of the relay lens 4.

TABLE 3

($d_2 = 5.028$)

| surface number | r | d | nd | v | n780 |
|---|---|---|---|---|---|
| 1 | 34.000 | 2.000 | 1.69350 | 53.2 | 1.68468 |
| 2 | −24.500 | 1.500 | 1.80518 | 25.4 | 1.78565 |
| 3 | −180.770 | 94.841 | | | |
| 4 | 180.770 | 1.500 | 1.80518 | 25.4 | 1.78565 |
| 5 | 24.500 | 2.000 | 1.69350 | 53.2 | 1.68468 |
| 6 | −34.000 | | | | |

Table 4 below shows a structure of the deflecting prism 6. The reduced thickness of the prism 37.068 mm. "$d_3$" designates the distance between the terminal lens surface of the relay lens 5 and the first lens surface of the prism 6.

TABLE 4

($d_3 = 38.075$)

| surface number | r | d | nd | v | n780 |
|---|---|---|---|---|---|
| 1 | ∞ | 56.000 | 1.51633 | 64.1 | 1.51072 |
| 2 | ∞ | | | | |

Table 5 below shows a structure of the objective lens 7. "$d_4$" designates the distance between the terminal surface of the prism 6 and the first lens surface of the objective lens 7.

TABLE 5

($d_4 = 10.000$)

| surface number | r | d | nd | v | n780 |
|---|---|---|---|---|---|
| 1 | 7.056 | 1.170 | 1.77250 | 49.6 | 1.76203 |
| 2 | −80.922 | 0.430 | | | |

TABLE 5-continued ($d_4 = 10.000$)

| surface number | r | d | nd | v | n780 |
|---|---|---|---|---|---|
| 3 | −6.667 | 0.800 | 1.84666 | 23.8 | 1.82484 |
| 4 | 4.194 | 1.420 | 1.77250 | 49.6 | 1.76203 |
| 5 | −65.760 | 0.780 | | | |
| 6 | 16.720 | 1.220 | 1.77250 | 49.6 | 1.76203 |
| 7 | −8.327 | 0.050 | | | |
| 8 | 3.300 | 1.150 | 1.77250 | 49.6 | 1.76203 |
| 9 | 6.818 | 1.783 | | | |
| 10 | ∞ | 1.200 | 1.51633 | 64.1 | 1.51072 |
| 11 | ∞ | | | | |

In the embodiment, the distance between the emission surface of the collimating lens 2 and the incident surface of the objective lens 7 is 199.984 mm and is identical to the conjugate distance of the relay lenses 4 and 5. In the calculation, the thicknesses of the beam splitter 3 and the prism 6 are substituted by the reduced thicknesses.

In the first embodiment mentioned above, the focusing sensitivity is such that when a unit displacement "1" of the collimating lens in the optical axis occurs, there is a change of 0.17 in back focus of the objective lens. The tracking sensitivity is such that when a unit displacement "1" of the collimating lens within a plane perpendicular to the optical axis occurs, there is a change of 0.41 in the movement of the beam.

Figure 3:
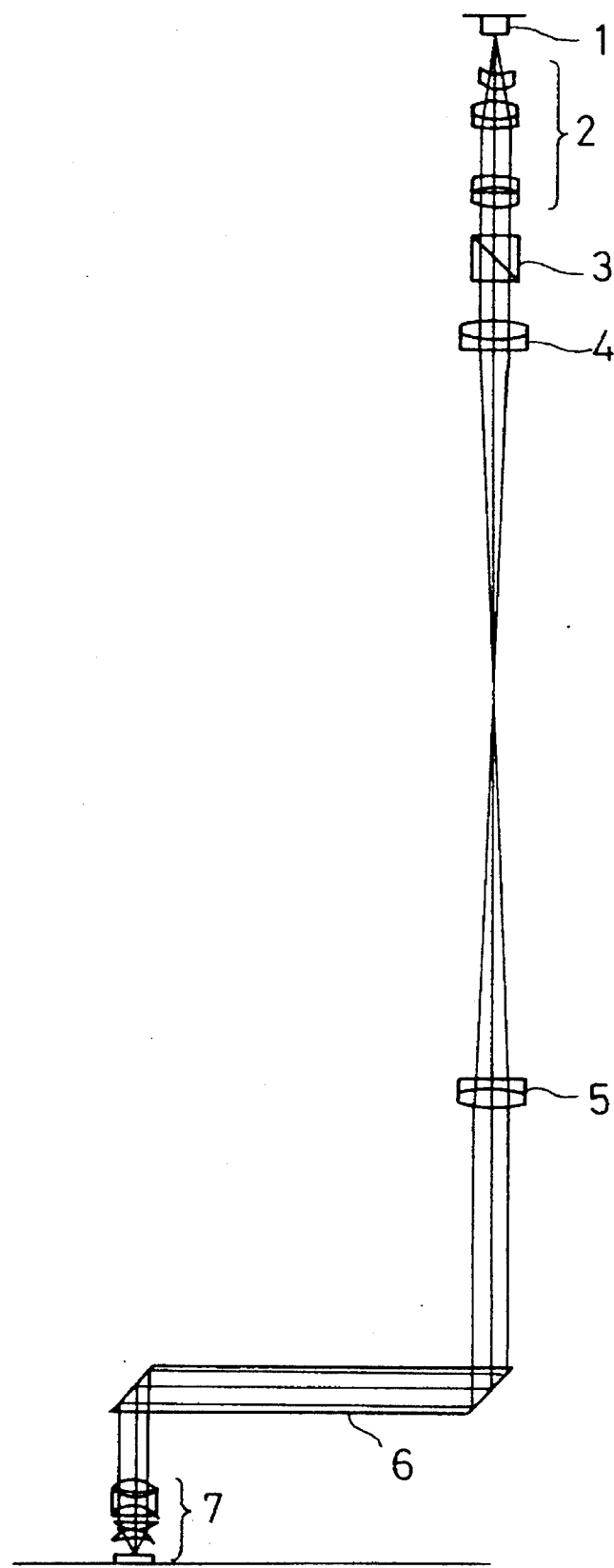
FIG. 3 is an explanatory view of an optical system of an optical recording and reproducing apparatus in which a collimating lens is moved in an optical axis direction by 180 µm from a reference position shown in FIG. 2, according to a first embodiment of the present invention.

FIG. 3 shows a beam when the collimating lens 2 is moved in the optical axis direction by +180 μm from the reference position shown in FIG. 2. The movement of the collimating lens 2 causes a change of −30 μm in the back focus of the objective lens. The sign is positive (+) when the movement occurs towards the optical tape side.

Figure 4:
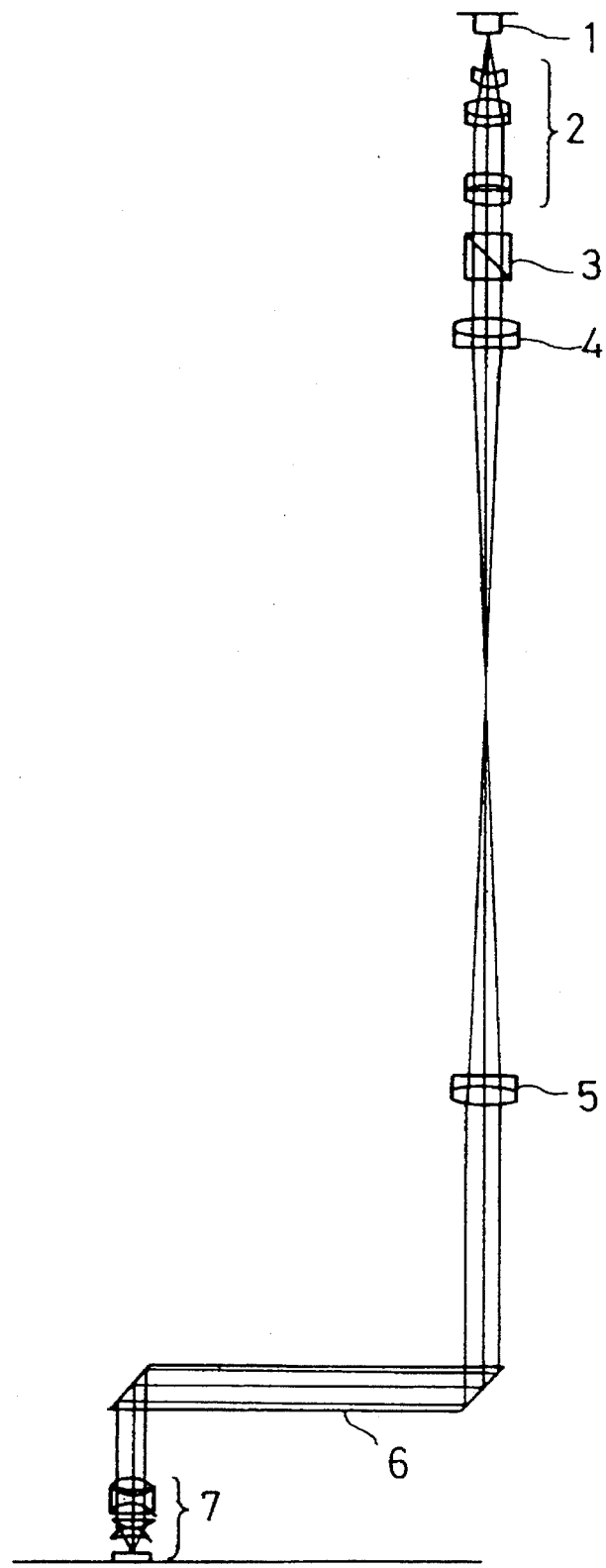
FIG. 4 is an explanatory view of an optical system of an optical recording and reproducing apparatus in which a collimating lens is moved in an optical axis direction by −180 µm from a reference position shown in FIG. 2, according to a first embodiment of the present invention.

FIG. 4 shows a beam when the collimating lens 2 is moved in the optical axis direction by −180 μm from the reference position shown in FIG. 2. The movement of the collimating lens 2 causes a change of +30 μm in the back focus of the objective lens.

In both cases shown in FIGS. 3 and 4, the beam can be effectively made incident upon the objective lens without changing the diameter of the beam.

Figure 5:
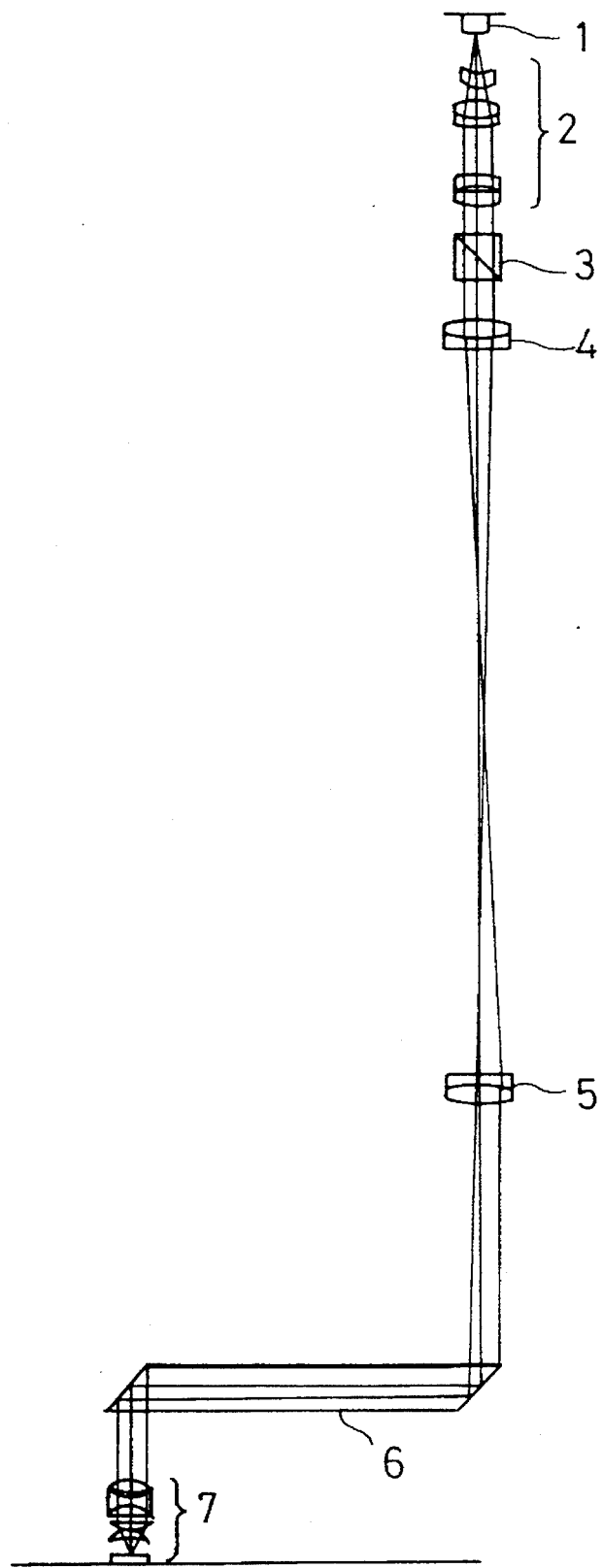
FIG. 5 is an explanatory view of an optical system of an optical recording and reproducing apparatus in which a collimating lens is moved within a plane perpendicular to the optical axis by 150 µm from a reference position shown in FIG. 2, according to a first embodiment of the present invention.

FIG. 5 shows a beam when the collimating lens 2 is moved by 150 μm within a plane perpendicular to the optical axis from the reference position shown in FIG. 2. The movement of the collimating lens 2 causes a displacement of the beam by 61 μm, but no vignetting occurs. Accordingly, the beam can be effectively received by the objective lens 7.

Figure 6:
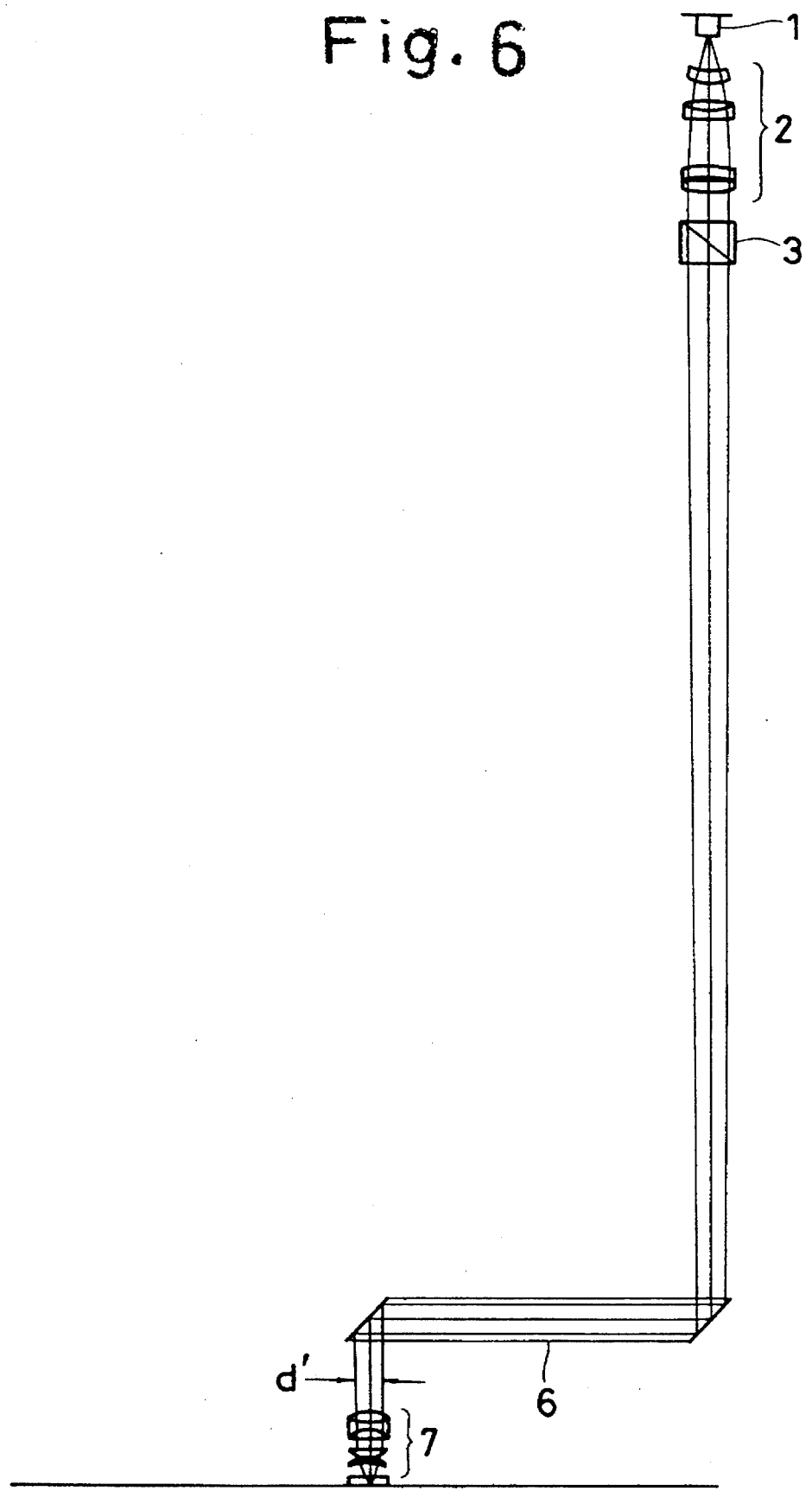
FIG. 6 is an explanatory view of a comparative example of an optical system of an optical recording and reproducing apparatus having no relay lens, wherein a collimating lens is moved in an optical axis direction by 180 µm.
Figure 7:
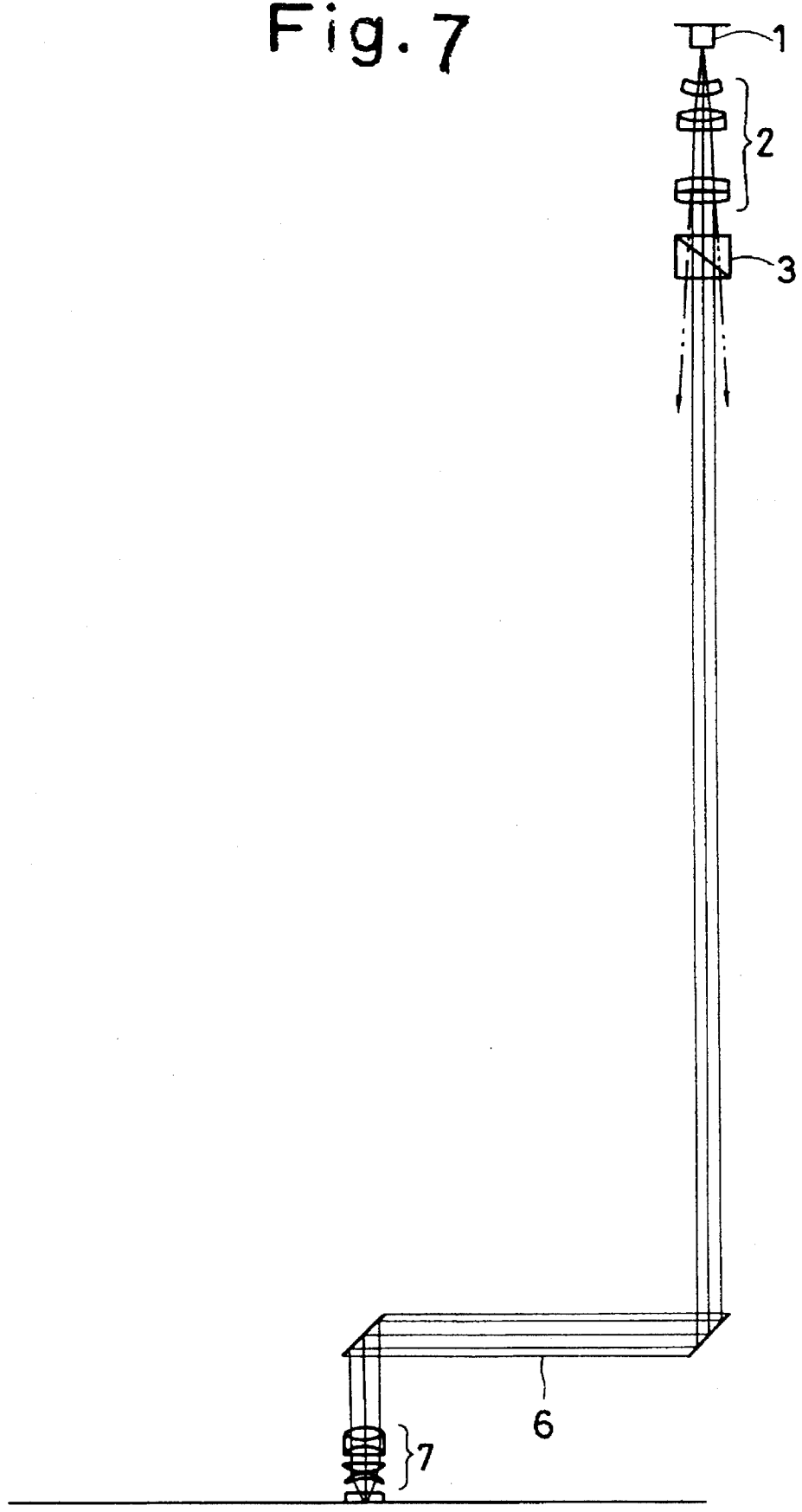
FIG. 7 is an explanatory view of a comparative example of an optical system of an optical recording and reproducing apparatus having no relay lens, wherein a collimating lens is moved in an optical axis direction by −180 µm.

FIGS. 6 and 7 show comparative examples corresponding to FIGS. 3 and 4. Namely, in an optical system having no relay lens shown in FIG. 6, the collimating lens 2 is moved in the optical axis direction by +180 μm; and in an optical system having no relay lens shown in FIG. 7, the collimating lens 2 is moved in the optical axis direction by −180 μm, respectively.

As can be seen in FIG. 6, when the collimating lens is moved in the optical axis direction to perform the focusing operation, the movement of the collimating lens towards the objective lens causes the beam which is made incident on the objective lens to converge. Namely, the diameter d' of the beam incident upon the objective lens 7 becomes considerably small. Consequently, the numerical aperture (N.A.) of the beam emitted from the objective lens 7 is substantially reduced. Accordingly, the size of the beam diameter incident upon the recording medium is increased, which results in increased crosstalk and a lower packing density. The differences in diameter of the beam between FIGS. 3 and 8 are not detectable by the naked eye.

Conversely, as can be seen in FIG. 7, the movement of the collimating lens 2 towards the light source 1 causes the beam to diverge, as shown by a two-dotted chain line in FIG. 7, which limits the amount of light that can be utilized due to the occurrence of vignetting. Please note that the diverging angle of the two-dotted chain line is exaggerated.

Figure 8:
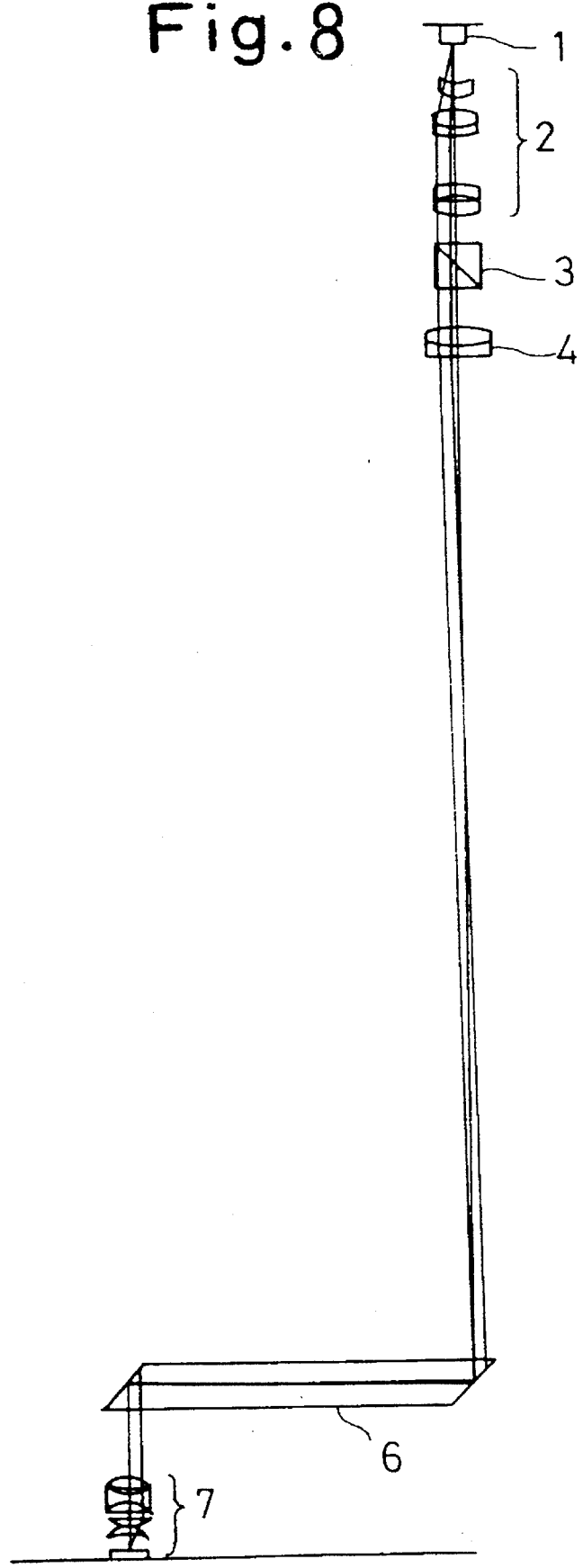
FIG. 8 is an explanatory view of a comparative example of an optical system of an optical recording and reproducing apparatus having no relay lens, wherein a collimating lens is moved within a plane perpendicular to an optical axis by 150 µm.

FIG. 8 shows a comparative example corresponding to FIG. 5. Namely, in an optical system having no relay lens, shown in FIG. 8, the collimating lens 2 is moved by 150 μm within a plane normal to the optical axis. As may be seen in FIG. 8, more than half the beam is eclipsed and, accordingly, is not received by the objective lens 7.

Figure 9:
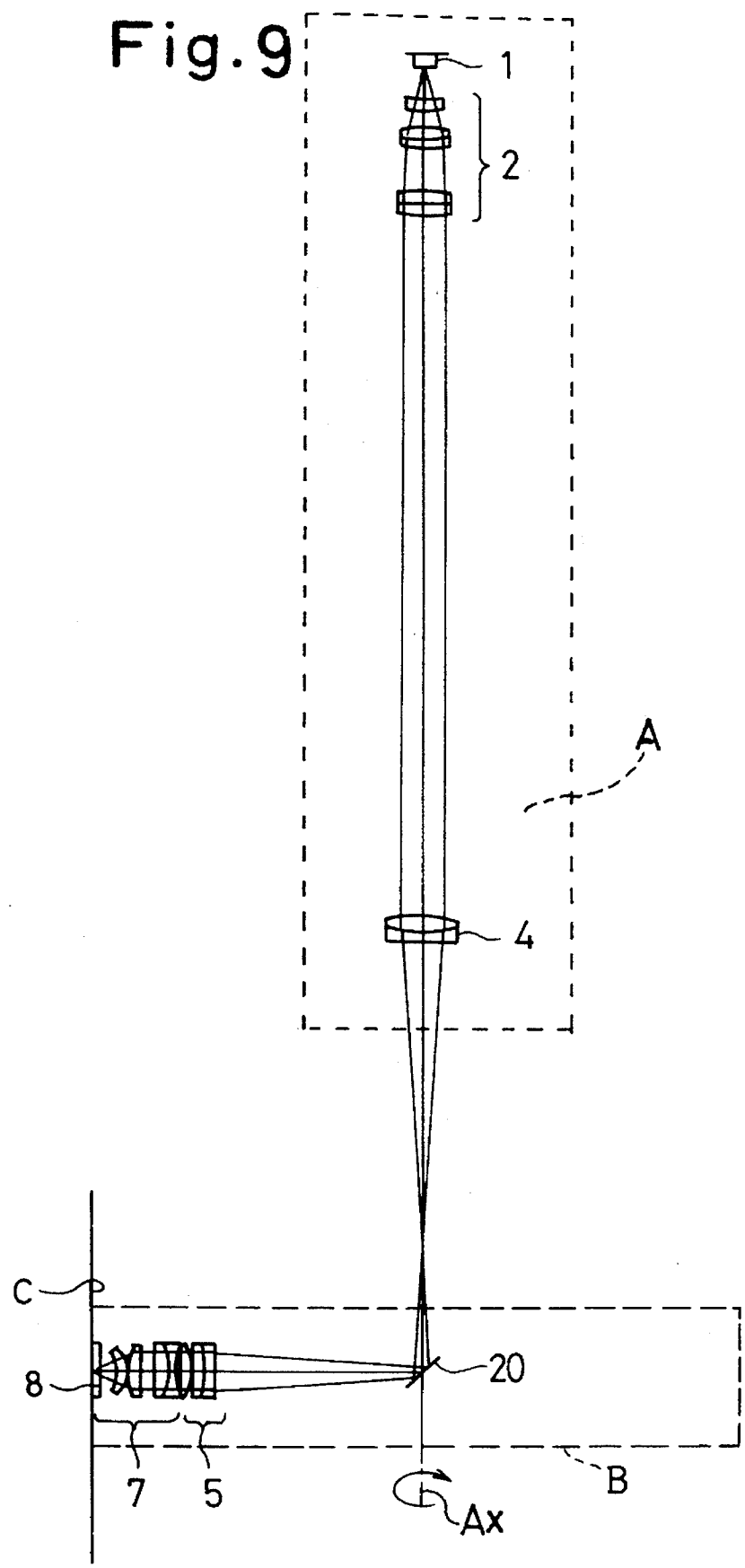
FIG. 9 is an explanatory view of an optical system of an optical recording and reproducing apparatus according to another embodiment of the present invention.

FIG. 9 shows another embodiment of an optical recording and reproducing apparatus according to the present invention.

In this embodiment, the deflector is in the form of one mirror 20 provided in the rotatable head "B", instead of the prism 6 in the first embodiment. Consequently, when the rotatable head B rotates about the optical axis Ax, a cylindrical inner surface C having the center of rotation on the optical axis Ax is scanned with the beam. The tape 8 is located on the cylindrical inner surface C. The relay lens 4 is secured to the stationary portion "A", and the relay lens 5 is provided in the vicinity of the objective lens 7 within the rotatable head "B". The remaining construction of the optical system of the second embodiment is the same as that of the first embodiment mentioned above. In FIG. 9, the elements corresponding to those in FIG. 2 are designated with like reference numerals; no explanation therefore will be given herein.

The structure of the collimating lens 2 is the same as that of the first embodiment shown in Table 1 discussed above. Tables 6 and 7 below show numerical data of the relay lenses 4 and 5 and the collimating lens 7 in the second embodiment. In Table 6, "$d_5$" designates the distance between the terminal lens surface of the collimating lens 2 and the first lens surface of the relay lens 4; and "$d_6$" in Table 7 designates the distance between the terminal lens surface of the relay lens 5 and the first lens surface of the objective lens 7, respectively.

TABLE 6

($d_5$ = 98.043)

| surface number | r | d | nd | v | n780 |
| --- | --- | --- | --- | --- | --- |
| 1 | 34.000 | 2.000 | 1.69350 | 53.2 | 1.68468 |
| 2 | −24.500 | 1.500 | 1.80518 | 25.4 | 1.78565 |
| 3 | −180.770 | 94.841 | | | |
| 4 | 180.770 | 1.500 | 1.80518 | 25.4 | 1.78565 |
| 5 | 24.500 | 2.000 | 1.69350 | 53.2 | 1.68468 |
| 6 | −34.000 | | | | |

TABLE 7

($d_6$ = 0.100)

| surface number | r | d | nd | v | n780 |
| --- | --- | --- | --- | --- | --- |
| 1 | 9.763 | 1.700 | 1.77250 | 49.6 | 1.76203 |
| 2 | −212.222 | 0.650 | | | |
| 3 | −11.336 | 1.100 | 1.84666 | 23.8 | 1.82484 |
| 4 | 7.040 | 2.100 | 1.72916 | 54.7 | 1.72007 |
| 5 | −69.476 | 2.000 | | | |
| 6 | 26.500 | 1.830 | 1.77250 | 49.6 | 1.76203 |
| 7 | −12.800 | 0.080 | | | |
| 8 | 4.161 | 2.000 | 1.77250 | 49.6 | 1.76203 |
| 9 | 6.530 | 2.340 | | | |
| 10 | ∞ | 1.200 | 1.51633 | 64.1 | 1.51072 |

TABLE 7-continued ($d_6$ = 0.100)

| surface number | r | d | nd | v | n780 |
| --- | --- | --- | --- | --- | --- |
| 11 | ∞ | | | | |

In the second embodiment, the distance between the emission surface of the collimating lens 2 and the incident surface of the objective lens 7 is 199.984 mm, which is identical to the conjugate distance of the relay lenses 4 and 5.

In the second embodiment, the focusing and tracking operations are effected by the collimating lens 2, similar to the first embodiment. The focusing sensitivity is such that when a unit displacement "1" of the collimating lens in the optical axis direction takes place, the back focus of the objective lens 7 changes by 0.36; and the tracking sensitivity is such that when a unit displacement "1" of the collimating lens within a plane normal to the optical axis takes place, the movement of the beam by 0.60 occurs.

Figure 10:
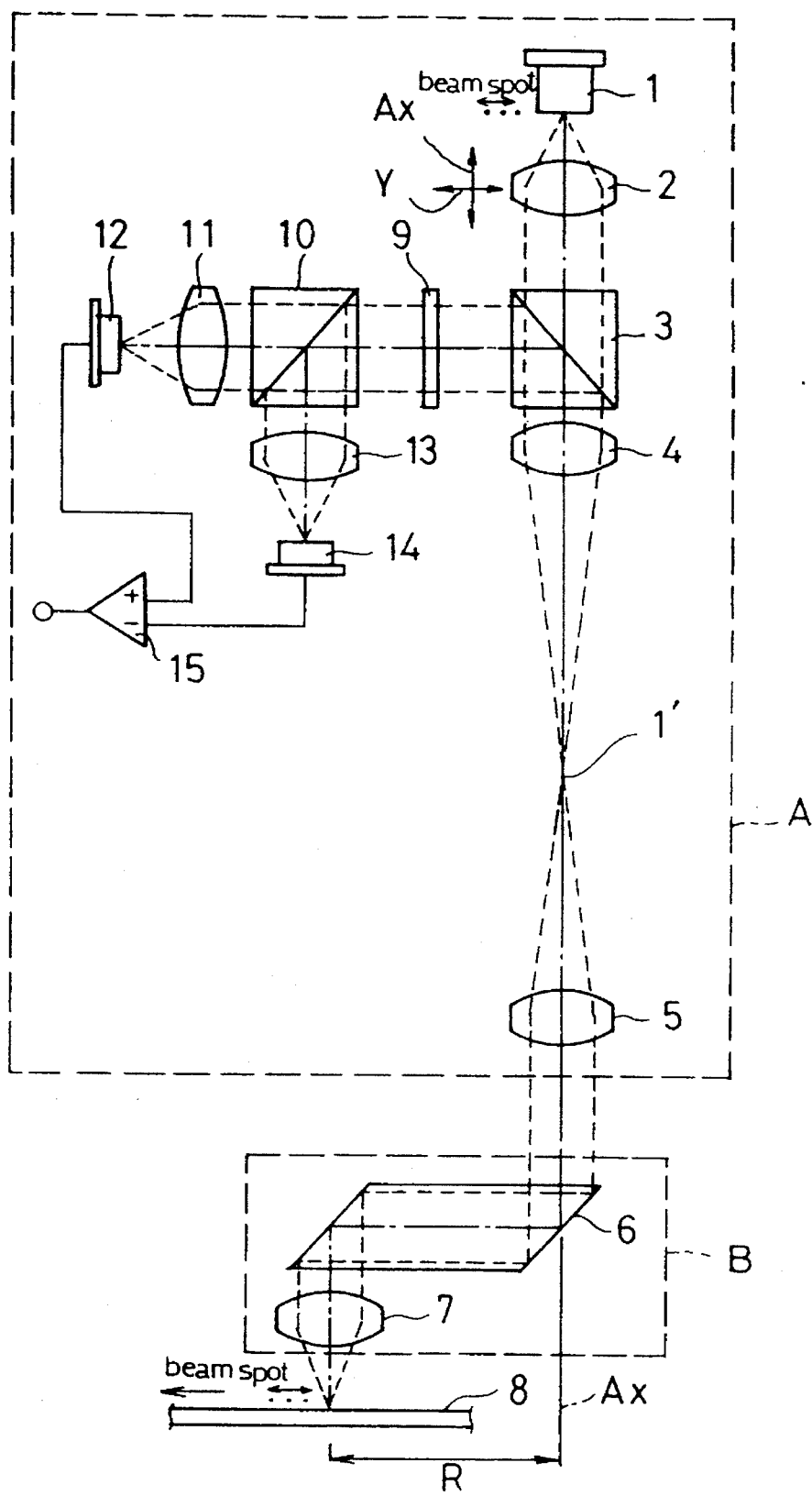
FIG. 10 is a conceptual view of an optical system applied to a multi-beam system of optical recording and reproducing apparatus, according to the present invention; and, FIG. 11 is an explanatory view of the conjugate distance defined by the relay lens group shown in FIG. 10 (i.e., the distance between conjugate points defined by the relay lens group), according to the present invention.

The following discussion will be directed to an embodiment applied to a multi-beam system as shown in FIG. 10. This embodiment is concerned with preventing the distance between the beams of the semiconductor laser formed on the recording medium in a multi beam system from changing during the focusing operation.

Figure 11:
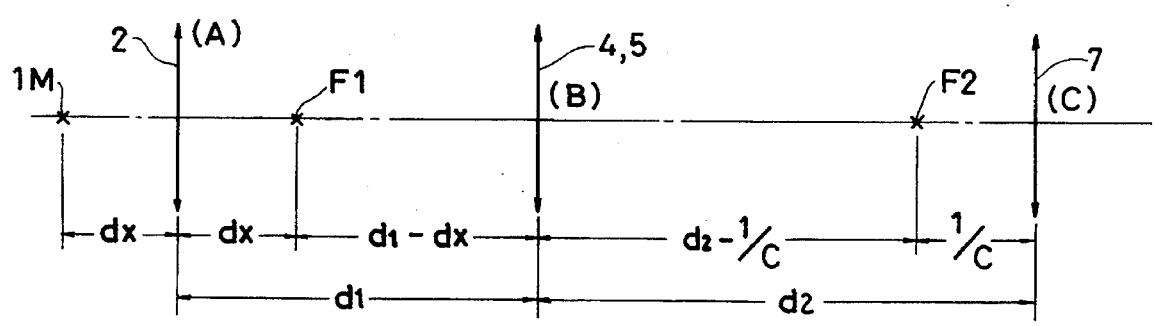

The magnification of an optical system comprised of three lens elements will be discussed below to help clarify the principle of the present embodiment shown in FIG. 11. In the following discussion, the powers of the collimating lens (i.e., focusing lens) 2, the relay lens (lenses 4 and 5), and the objective lens 7 are represented by "A", "B" and "C", respectively. The symbols "dx", "d1", and "d2" designate the distance of the front principal point of the focusing lens 2 from the light source 1M, the distance between the rear principal point of the focusing lens 2 and the front principal point of the relay lenses, and the distance between the rear principal point of the relay lenses and the front principal point of the objective lens 7, respectively. The constant D which is not varied by the movement of the focusing lens is given by D=dx+d1.

The resultant magnification "m" of the optical system shown in FIG. 10 is given by;

$$m=(1-dx \cdot A)[(1-C \cdot d2-(D-dx)X]-dx \cdot X \qquad (1)$$

wherein X=(B−B·C·d2+C)

The change of the magnification by the focusing is represented by the following equation;

$$\begin{aligned}\partial m/\partial dx &= -A[1-C \cdot d2-(D- \\ &\quad 2 \cdot dx)(B-B \cdot C \cdot d2+C)] \\ &= -A \cdot C[(d2-1/C)- \\ &\quad (d1-dx)(d2-1/C)B+(d1-dx)]\end{aligned} \qquad (2)$$

In the present invention, the equation (2) is equal to zero to eliminate the change of the magnification which would be otherwise caused by the focusing. Note that neither "A" nor "C" can be identical to zero, because if the "A" is zero, no focusing can be effected, and "C" must be a positive value to form a beam spot.

Consequently, to make the equation (2) identical to zero, according to the present invention, the following equation is obtained.

$$[(d2-1/C)-(d1-dx)(d2-1/C)B+(d1-dx)]=0 \qquad (3)$$

From this, $$B = 1/(d1-dx) + 1/(d2-1/C) \qquad (4)$$

Equation (4) shows that the relay lens makes the point F1 at a distance (d1−dx) from the relay lens and the point F2 at a distance (d2−1/C) from the objective lens (i.e., the front focal point of the objective lens) conjugate. In other words, the relay lenses 4 and 5 make the point F1, which is located at a distance "dx" from the rear principal point of the collimating lens 2 on the objective lens side, substantially conjugate with the front focal point F2 of the objective lens 7, wherein "dx" is given by the distance between the light source 1M and the front principal point of the collimating lens 2.

The optical arrangement shown in FIG. 10 is substantially identical to that shown in FIG. 1, except for the substitution of the semiconductor laser 1 in FIG. 1 with a multi-emission type of semiconductor laser 1M in FIG. 10. The multi-emission type of semiconductor laser 1M is comprised of an array of light emitters juxtaposed in the horizontal direction in FIG. 10. An image of the light emitter array is formed by the relay lenses 4 and 5 and is then formed on the optical tape 8 as an image array juxtaposed in the lateral direction in FIG. 10.

In the first embodiment mentioned above, as can be seen in Table 1 mentioned above, the front principal point and rear principal point of the collimating lens 2 are located at a distance of 5.139 mm from the 1st lens surface on the rear side and a distance of 9.600 mm from the 9th surface on the front side, respectively.

Also, in the first embodiment, the distance "dx" between the light source 1M and the front principal point of the focusing lens 2 is 10.000 mm, and the point F1 which is located on the objective lens side at a distance identical to the distance "dx" from the rear principal point of the focusing lens 2 is located at 0.400 mm from the emission surface of the focusing lens 2 on the objective lens side.

The front focal point F2 of the objective lens 7 is located at 0.344 mm from the incident surface of the objective lens 7 on the front side. Accordingly, the distance between the points F1 and F2 is 199.984 mm, which is identical to the conjugate distance of the relay lenses 4 and 5. Note that the thicknesses of the beam splitter 3 and the prism 6 were substituted with the reduced thicknesses in calculation.

In the first embodiment, the magnification at the reference position is 0.408; the magnification when the focusing lens is moved by −180 μm to focus the image at the position of +30 μm (the positive sign "+" refers to the direction towards the optical tape 8) is 0.408; and the magnification when the focusing lens is moved by +180 μm to focus the image at the position of −30 μm is also 0.408. Namely, there is no change of the magnification.

If there were no relay lenses 4 and 5 in the first embodiment, the magnification at the reference position would be −0.408; the magnification when the focusing lens is moved by −280 μm to focus the image at the position of +30 μm (positive sign "+" refers to the direction towards the optical tape) would be −0.261; and the magnification when the focusing lens is moved by +130 μm to focus the image at the position of −30 μm would be −0.550. Namely, not only would there be a considerable change of magnification, but also the distance between the beam spots would change, accordingly.

In the second embodiment, the conjugate distance of the relay lenses 4 and 5 is 199.984 mm and the front focal point F2 of the objective lens 7 is located at a distance of 0.165 mm behind the first lens surface.

In the second embodiment, the point F1 which is located on the objective lens side at a distance identical to the distance "dx" between the light source 1M and the front principal point X1 of the focusing lens 2, from the rear principal point X2 of the focusing lens 2 is located 199.984 mm from the rear principal point of the focusing lens, which is identical to the conjugate distance of the relay lenses 4 and 5.

In the second embodiment, the magnification at the reference position is 0.600; the magnification when the focusing lens is moved by −83 μm to focus the image at the position of +30 μm is 0.600; and the magnification when the focusing lens is moved by +83 μm to focus the image at the position of −30 μm is also 0.600. Namely, there is no change in the magnification.

The present invention can be applied to a conventional optical disc apparatus or the like, although the illustrated embodiments are applied to an optical tape system.

In the embodiments mentioned above, the relay lenses 4 and 5 whose angular magnification is −1 are provided to have a constant conjugate distance in the illustrated embodiment. However, it is possible to provide a focal relay lenses whose angular magnification is not −1 or relay lenses having a finite focal length, provided that the exit pupil of the collimating lens (i.e., movable lens) 2 is conjugate with the entrance pupil of the objective lens 7, as can be seen from equation (4) mentioned above in which no magnification of the relay lenses is referred to. The angular magnification of −1 contributes to no limitation in the location of the relay lenses. Note that in the case that the relay lenses 4 and 5 have an angular magnification of −1, the principle point mentioned above does not exist.

Figure 12:
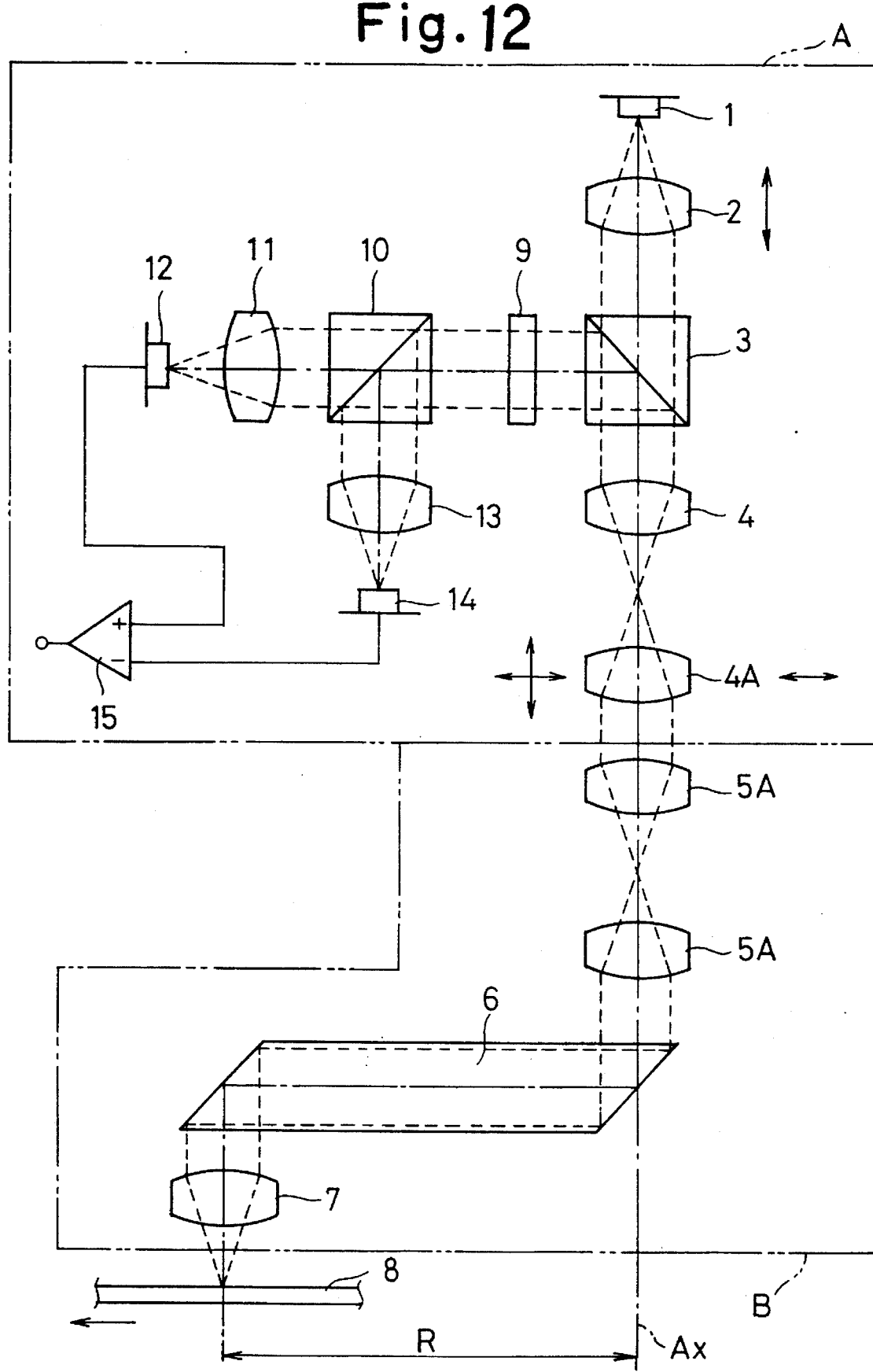
FIG. 12 is a conceptual view of an optical recording and reproducing apparatus, according to still another embodiment of the present invention.

In the embodiments mentioned above, although the collimating lens 2 is moved to perform the focusing and tracking operations, it is possible to provide an additional movable lens for the tracking and focusing operations between the relay lenses and the objective lens. Furthermore, it is also possible to provide separate movable lenses for the tracking operation and the focusing operations, as shown in FIG. 12. In FIG. 12, there is a second relay lens comprised of lenses 4A and 5A between the first relay lenses (i.e., collimating lenses) 4 and 5. The relay lens 4A is provided in the stationary portion "A" and the relay lens 5A is provided in the rotatable head "B". In the embodiment illustrated in FIG. 12, the second relay lens (i.e., collimating lens) 4A provided in the stationary portion "A" is used to effect both the focusing and tracking operations. Alternatively, it is possible to use one of the collimating lens 2 and 4A to effect the focusing operation and use the other collimating lens 4A or 2 to effect the tracking operation, respectively.

As can be understood from the above discussion, according to the embodiments of the present invention applied to the multi-beam system, wherein a lens other than the objective lens is moved in the optical axis direction to perform the focusing operation, no change of the magnification takes place, nor does a change occur in the distance between the beam spots, during the movement of the focusing lens.

Moreover, as can be understood from the foregoing, according to the second embodiment, since the movable lens provided outside the rotatable head can be easily moved to effect the focusing and/or tracking operations, the rotatable head can be made small and light.

In particular, since the relay lenses make the exit pupil of the movable lens substantially conjugate with the entrance pupil of the objective lens, there is little or no change in the diameter and position of the beam incident upon the objective lens during the movement of the movable lens. Consequently, there is no increase in the diameter of the beam due to the reduction of N.A., which would be otherwise decreased, and there is no loss in the amount of light due to vignetting which would otherwise occur. Thus, a simple and reliable optical recording and reproducing apparatus can be obtained, according to the present invention.

We claim:

1. An optical recording and reproducing apparatus comprising:

a light source that emits a beam of light;

a rotatable head including a deflector which deflects said beam in a predetermined direction and an objective lens group which focuses an image of said beam on an optical recording medium, wherein said rotatable head rotates about an optical axis of said beam which is incident upon said rotatable head;

a movable lens group provided along the optical axis of said beam between said light source and said rotatable head, wherein said movable lens group is driven in at least the optical axis direction; and a relay lens group provided between said movable lens group and said objective lens group, wherein an exit pupil of said movable lens group is made substantially conjugate with an entrance pupil of said objective lens group by said relay lens group.

2. The optical recording and reproducing apparatus according to claim 1, said optical recording medium comprising an optical tape.

3. The optical recording and reproducing apparatus of claim 1, said movable lens group is also movable within a plane perpendicular to the optical axis.

4. The optical recording and reproducing apparatus of claim 1, wherein said movable lens group is a single lens.

5. The optical recording and reproducing apparatus of claim 1, wherein said relay lens group comprises at least a pair of lens elements.

6. The optical recording and reproducing apparatus of claim 5, wherein said pair of lens elements are supported by a stationary element, and wherein said stationary element also supports said light source.

7. The optical recording and reproducing apparatus of claim 5, wherein said pair of lens elements are identical and symmetrical about a plane located between said pair of lens elements, and wherein an angular magnification of said relay lens group is −1.

8. The optical recording and reproducing apparatus of claim 7, wherein one of said pair of lens elements is supported by a stationary element, and wherein said stationary element also supports said light source, and further wherein the other of said pair of lens elements is provided in said rotatable head.

9. The optical recording and reproducing apparatus of claim 1, wherein said light source is a multi-emission type laser.

10. An optical recording and reproducing apparatus comprising:

a light source;

an objective lens group which focuses a plurality of beams on an optical recording medium;

a focusing lens group provided along an optical axis of said beams between said light source and said objective lens group, wherein said focusing lens group is driven along the optical axis direction, wherein a point located at a predetermined distance from a rear principal point of said focusing lens group is maintained substantially conjugate with a front focal point of said objective lens group, and wherein said predetermined distance is equivalent to a distance between said light source and a front principal point of said focusing lens group, said rear principal point being defined as the principal point of said focusing lens group on an objective lens side of said optical axis, said front principal point being defined as the principal point of said focusing lens group on a light source side of the optical axis, and said front focal point being defined as the focal point of said objective lens group on said light source side of the optical axis.

11. An optical recording and reproducing apparatus comprising:

a light source that emits a beam of light;

a rotatable head including a deflector which deflects said beam in a predetermined direction and an objective lens group which focuses an image of said beam on an optical recording medium, wherein said rotatable head rotates about an optical axis of said beam which is incident upon said rotatable head;

a movable lens group provided along the optical axis of said beam between said light source and said rotatable head, wherein said movable lens group is driven in at least a plane perpendicular to said optical axis; and a relay lens group provided between said movable lens group and said objective lens group, wherein an exit pupil of said movable lens group is made substantially conjugate with an entrance pupil of said objective lens group by said relay lens group.

12. The optical recording and reproducing apparatus according to claim 11, said optical recording medium comprising an optical tape.

13. The optical recording and reproducing apparatus of claim 11, further comprising:

a movable lens group which is movable in an optical axis direction.

14. The optical recording and reproducing apparatus of claim 11, wherein said lens group which is movable within a plane perpendicular to the optical axis and said lens group which is movable in the optical axis direction is a single lens.

15. The optical recording and reproducing apparatus of claim 11, wherein said relay lens group comprises at least a pair of lens elements.

16. The optical recording and reproducing apparatus of claim 11, wherein said pair of lens elements are identical and symmetrical about a plane located between said pair of lens elements, and wherein an angular magnification of said relay lens group is −1.

17. The optical recording and reproducing apparatus of claim 11, wherein said pair of lens elements and said light source are supported by a stationary element.

18. The optical recording and reproducing apparatus of claim 11, wherein one of said pair of lens elements and said light source is supported by a stationary element, and wherein the other of said pair of lens elements is supported by said rotatable head.

19. The optical recording and reproducing apparatus of claim 11, wherein said light source is a multi-emission type laser.

20. An optical recording and reproducing apparatus comprising:

a light source;

an objective lens group which focuses a plurality of beams on an optical recording medium;

a focusing lens group provided along an optical axis of said beams between said light source and said objective lens group, wherein said focusing lens group is driven along the optical axis direction; and a relay lens group provided between said focusing lens group and said objective lens group, wherein a point located at a predetermined distance from a rear principal point of said focusing lens group is maintained substantially conjugate with a front focal point of said objective lens group by said relay lens group, and wherein said predetermine distance is equivalent to a distance between said light source and a front principal point of said focusing lens group, said rear principal point being defined as the principal point of said focusing lens group on an objective lens side of said optical axis, said front principal point being defined as the principal point of said focusing lens group on a light source side of the optical axis, and said front focal point being defined as the focal point of said objective lens group on said light source side of the optical axis.

21. The optical recording and reproducing apparatus according to claim 20, said optical recording medium comprising an optical tape.

22. The optical recording and reproducing apparatus of claim 20, wherein said predetermined distance is identical to a focal length of said focusing lens group.

23. The optical recording and reproducing apparatus of claim 20, wherein said beams emitted from said relay lens group are collimated.

24. The optical recording and reproducing apparatus of claim 20, further comprising:

a head which is rotatable about the optical axis of said beam and which includes a deflector which deflects said beam towards said objective lens group, said objective lens group being provided within said rotatable head.

25. The optical recording and reproducing apparatus of claim 20, wherein said relay lens group has no power and an angular magnification of −1.

26. The optical recording and reproducing apparatus of claim 25, wherein said relay lens group comprises at least a pair of lens elements.

27. The optical recording and reproducing apparatus of claim 26, wherein said pair of lens elements are identical and symmetrical about a plane located between said pair of lens elements.

28. The optical recording and reproducing apparatus of claim 26, wherein said pair of lens elements are supported by a stationary element and wherein said stationary portion also supports said light source.

29. The optical recording and reproducing apparatus of claim 26, wherein one of said pair of lens elements and said light source is supported by a stationary element, and wherein the other of said pair of lens elements is supported by a head which is rotatable about the optical axis of said beam, said head also including said objective lens group and a deflector which deflects said beam towards said objective lens group.

30. The optical recording and reproducing apparatus according to claim 20, wherein said light source emits a plurality of beams and said objective lens group focuses a plurality of images formed by said beams emitted from said light source on the optical recording medium.

* * * * *